UNITED STATES PATENT OFFICE.

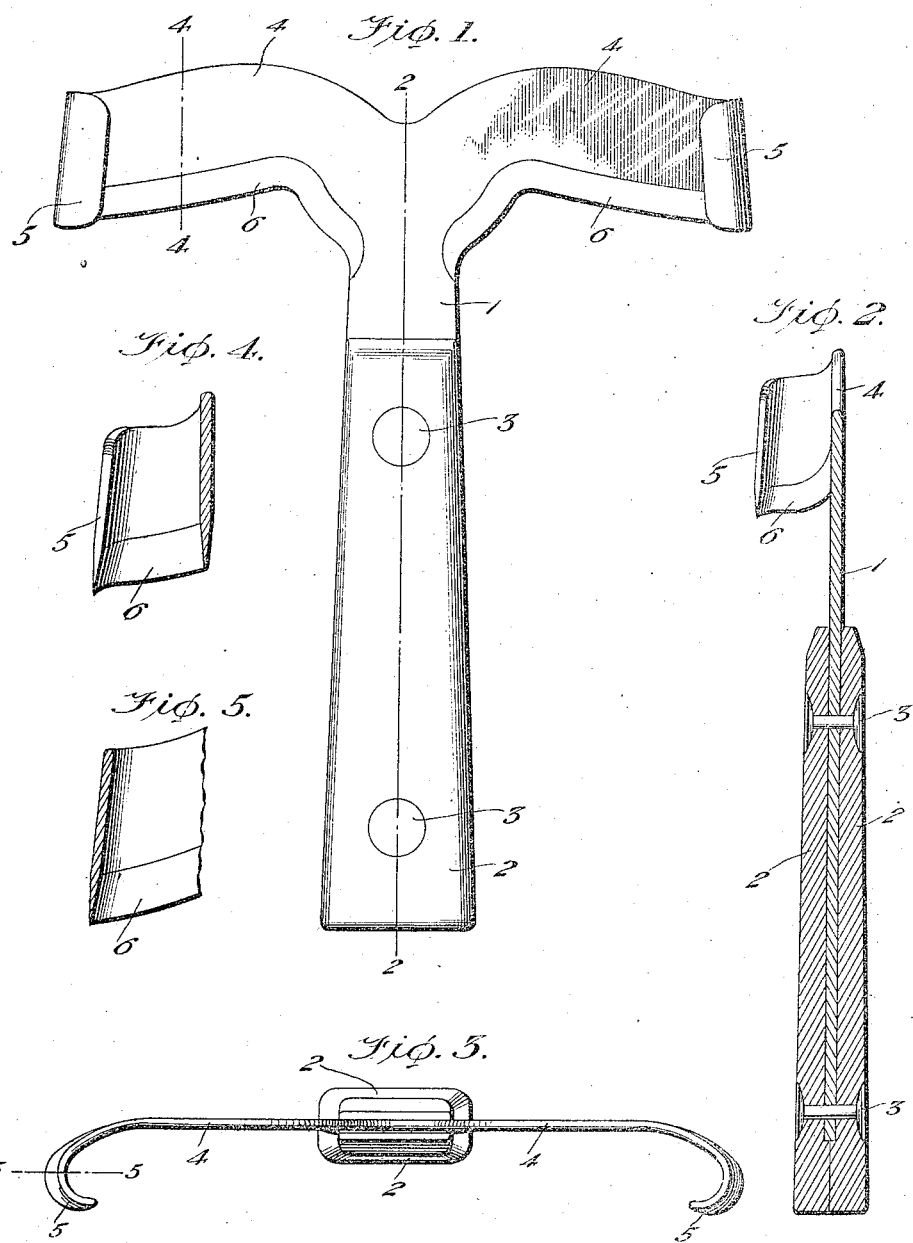

HORACE JOHNS, OF MAINESBURG, PENNSYLVANIA.

HOOF-KNIFE.

1,263,253.

Specification of Letters Patent.   Patented Apr. 16, 1918.

Application filed October 25, 1917.   Serial No. 198,419.

*To all whom it may concern:*

Be it known that I, HORACE JOHNS, a citizen of the United States, and a resident of Mainesburg, in the county of Tioga and State of Pennsylvania, have invented certain new and useful Improvements in Hoof-Knives, of which the following is a specification.

My invention is an improvement in hoof knives, and has for its object to provide a knife of the character specified, by means of which all of the operations necessary to be performed in the trimming of a horse's hoof preparatory to shoeing may be accomplished.

In the drawings:

Figure 1 is a front view of the improved knife;

Figs. 2 and 4 are sections on the lines 2—2 and 4—4 of Fig. 1;

Fig. 3 is an end view of the knife; and

Fig. 5 is a section on the line 5—5 of Fig. 3.

In the present embodiment of the invention, the knife comprises a shank 1 which is connected to a handle, the handle consisting of similar sections 2 which are arranged upon opposite sides of the shank and are secured thereto by means of rivets 3. The shank 1 at its outer end has a pair of oppositely extending blades 4, each of which has the end turned over upon the face of the blade in spaced relation, as indicated at 5, said turned over portions being on the same side or face of the shank, and the lower edges of the blade, including the turned over portions 5, are sharpened, as indicated at 6, to form cutting edges.

These cutting edges, as shown in Fig. 1, extend upon the edges of the shank for a part of its length, and it will be noticed that those portions of the edges of the blades adjacent to the shank extend at an obtuse angle with respect to those portions remote from the shank.

In practice, the blades will be very thin and about one inch in width. With the improved knife, the horseshoer needs only a rasp in order to fit the shoe to the foot. In use, one blade is used for cutting half of the hoof and the other blade for the other half. Holding the tool upright, the hoof can be cleaned and the knife can be also used when the hoof is grown out at the toe, to dispense with a large amount of rasping. Corns can also be easily removed.

I claim:

1. A knife of the character specified, comprising a handle having blades extending from one end of the handle in opposite directions, the ends of the blades being bent over upon the bodies of the blades in spaced relation, and the edges of the blades adjacent to the handle being sharpened.

2. A knife of the character specified, comprising a handle and a shank to which the handle is connected, the shank extending beyond the handle at one end and having oppositely extending blades, each blade having its outer end turned over upon the body of the blade in spaced relation, said turned over portions being at the same face of the shank, and the edges of the blades adjacent to the handle being sharpened, said sharpened portions extending to the shank and being at an angle to the remaining portions removed from the shank.

3. A knife of the character specified, comprising a handle having blades extending from one end of the handle in opposite directions and in the plane of the handle, the ends of the blades being bent over upon the bodies thereof in spaced relation.

HORACE $\times$ JOHNS.
his mark

Witnesses to mark:
 JOHN W. BEAMAN,
 FRANK H. PALMER.